United States Patent
Myers et al.

(10) Patent No.: US 10,521,076 B1
(45) Date of Patent: Dec. 31, 2019

(54) BIG DATA SELECTOR SYSTEM AND METHOD

(71) Applicant: Allscripts Software, LLC, Chicago, IL (US)

(72) Inventors: Scott Douglas Myers, Ballwin, MO (US); Donald Robert Hedrich, St. Charles, MO (US); Chad Scott Rust, Wildwood, MO (US); Mike Broadwater, Columbia, IL (US)

(73) Assignee: ALLSCRIPTS SOFTWARE, LLC, Chicago, IL (US)

(*) Notice: Subject to any disclaimer, the term of this patent is extended or adjusted under 35 U.S.C. 154(b) by 327 days.

(21) Appl. No.: 14/986,524

(22) Filed: Dec. 31, 2015

Related U.S. Application Data

(63) Continuation of application No. 14/494,115, filed on Sep. 23, 2014, now Pat. No. 9,235,328.

(51) Int. Cl.
  *G06F 3/0482* (2013.01)
  *G06F 3/0484* (2013.01)
  *G06F 16/14* (2019.01)
  *G06F 3/0483* (2013.01)

(52) U.S. Cl.
  CPC ........ *G06F 3/0482* (2013.01); *G06F 3/04842* (2013.01); *G06F 16/156* (2019.01); *G06F 3/0483* (2013.01)

(58) Field of Classification Search
  CPC .................................................. G06F 3/0482
  See application file for complete search history.

(56) References Cited

U.S. PATENT DOCUMENTS

| | | | | |
|---|---|---|---|---|
| 6,763,377 | B1* | 7/2004 | Belknap | H04L 29/06027 709/223 |
| 7,822,707 | B1* | 10/2010 | Yehuda | G06F 17/30442 707/609 |
| 2002/0082892 | A1* | 6/2002 | Raffel | G06Q 10/063 705/7.26 |
| 2006/0074879 | A1* | 4/2006 | Covington | G06F 17/30398 |
| 2006/0206821 | A1* | 9/2006 | Chien | G06F 17/30067 715/733 |
| 2006/0235817 | A1* | 10/2006 | Wong | G06F 8/60 |
| 2011/0010672 | A1* | 1/2011 | Hope | G06F 3/04817 715/841 |
| 2012/0323935 | A1* | 12/2012 | Evans | G06F 17/30174 707/752 |

\* cited by examiner

*Primary Examiner* — Stella Higgs
(74) *Attorney, Agent, or Firm* — Loza & Loza, LLP; Peter Zura

(57) ABSTRACT

A graphical user interface (GUI) is disclosed that allows user to quickly find and select (assign) specific items from a large data source that is housed in the cloud. The GUI includes a first and second grid that display unassigned and assigned items, respectively. Each of the first and second grids allows the user to filter each grid by typing in the search criteria and forwarding the criteria to the server. Items in each of the first and second grids may be moved between the two grids to quickly change the assigned state of moved items.

17 Claims, 18 Drawing Sheets

| | | |
|---|---|---|
| Apply All Filter/Sort | | |
| Clear All Filter/Sort | | |
| Print | 0 | S/P DO NOT USE THIS CODE |
| Export to Excel | 002 | ALABAMA FARM BUREAU INS |
| Export to PDF | 003 | ACTIVE DUTY TRICARE PRIME |
| | 004 | AMERICAN NATIONAL INSURAN |
| 1000 – EPSI Hospital System | 005 | BANKERS LIFE |
| 1000 – EPSI Hospital System | 006 | CNA INSURANCE |
| 1000 – EPSI Hospital System | 007 | CIGNA CONNECTICUT GENERAL |
| 1000 – EPSI Hospital System | 008 | CONTINENTAL INSURANCE |
| 1000 – EPSI Hospital System | 009 | FIDELITY GUARANTY LIFE |
| 1000 – EPSI Hospital System | 010 | HARTFORD INSURANCE |
| 1000 – EPSI Hospital System | 011 | HOME INSURANCE COMPANY |
| 1000 – EPSI Hospital System | 012 | HUVANA CARE PLUS |
| 1000 – EPSI Hospital System | 013 | UNICARE/JOHN HANCOCK |
| 1000 – EPSI Hospital System | 014 | LIBERTY MUTUAL |
| 1000 – EPSI Hospital System | 015 | MASSACHUSETTS MUTUAL |
| 1000 – EPSI Hospital System | 106 | METROPOLITAN |
| 1000 – EPSI Hospital System | 017 | MUTUAL OF OMAHA |
| 1000 – EPSI Hospital System | 018 | NATIONAL FOUNDATION LIFE |
| 1000 – EPSI Hospital System | 019 | NEW ENGLAND LIFE |
| 1000 – EPSI Hospital System | 020 | NEW YORK LIFE |
| 1000 – EPSI Hospital System | 021 | JEFFERSON PILOT |

BIG DATA SELECTOR SYSTEM AND
METHOD

CROSS-REFERENCE TO RELATED APPLICATION

The present application is a U.S. continuation patent application of, and claims priority under 35 U.S.C. § 120 to, U.S. nonprovisional patent application Ser. No. 14/494,115, filed Sep. 23, 2014, which nonprovisional patent application and any patents issuing therefrom, including U.S. Pat. No. 9,235,328, are hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention relates to computing devices. More specifically, the present invention relates to retrieving content for use by a computing device.

There are currently many ways to select multiple items that are contained in large data stores that cannot all be brought down to the client at once. An example is gmail's implementation in its web-based email client. In this instance, the main interface is simply a grid with checkboxes next to each item. Each checkbox must be clicked to be selected then the next page button must be pressed to make a call to the server to get the next pages worth of data. Once you navigate to the next page there is no visual representation of what has been selected on previous pages. Gmail is operated in this manner because of the potential for a large amount of data to have to be accessed each time a user wants to view information.

Timing out of the web service call timing out is a problem with big data. A web service call that requires the return of all data or the searching of all data on the server may result in the request timing out without returning all of the data requested. The web service, in this example, cannot physically handle the amount of data to display to the end user.

Therefore, there exists a need for an improved method and system for allowing user to access specific items from a large data source that is stored in the cloud. This and other needs are addressed by one or more aspects of the present invention.

SUMMARY OF THE INVENTION

The present invention includes many aspects and features. Moreover, while many aspects and features relate to, and are described in, the context of healthcare applications, the present invention is not limited to use only in this context, as will become apparent from the following summaries and detailed descriptions of aspects, features, and one or more embodiments of the present invention.

Accordingly, one aspect of the present invention relates to a system comprising a server for storing a large collection of data sets accessed by a user through a computing device. The server including one or more server processors, and a non-transitory computer-readable medium storing computer program instructions operable to cause the one or more server processors to perform operations comprising receiving from a client computing device service calls to filter the items based on a filter criteria, and forwarding the filtered items to the client computing device. The client computing device comprising one or more client processors, and a non-transitory computer-readable medium storing a program having a graphical user interface (GUI) for controlling the retrieval of items from the server, the GUI including a first and second grid. The program for execution by the one or more client processors to perform operations comprising initiating the service call to the server, the service call including the filter criteria input by a user in the second grid, receiving filtered items retrieved by the server from the collection of data sets that include a first assigned state, displaying the received filtered items in the second grid, identifying one or more filtered items selected by the user, receiving an indication from the user to move the one or more selected items from the second grid to the first grid, moving the one or more selected items, wherein the moved items first assigned state is changed to unassigned, displaying in the first grid the unassigned items, detecting the selection of one or more unassigned items by the user, and moving the selected unassigned items to the second grid, wherein the unassigned state is changed to a second assigned state.

In a feature of this aspect, the one or more client processors performs operations further comprising separating first grid existing items in the first grid from the moved items, detecting the selection by the user to save the moved items in the first grid, and eliminating the separation between the first grid existing items and the moved items, wherein the first grid existing items' state is unassigned.

In another feature of this aspect, the second grid includes filtered items including a second assigned state.

In another feature of this aspect, the one or more client processors performs operations further comprising separating the selected unassigned items moved from the first grid from the second assigned state filtered items, detecting the selection by the user to save the moved items in the second grid, eliminating the separation between the first grid existing items and the moved items, and changing the unassigned state to the second assigned state for each unassigned item moved from the first grid.

In another feature of this aspect, the GUI further includes one or more paging controls comprising an item display count for defining by the user the number of filtered items to be displayed per page in the respective first and second grids, and a page indicator for navigating between multiple pages of filtered items.

In another feature of this aspect, the one or more client processors performs operations further comprising navigating between the multiple pages in the second grid, and identifying one or more filtered items selected by the user as the user navigates between the multiple pages.

In another feature of this aspect, the moved items are displayed to the user in the first grid as the user navigates between the multiple pages in the second grid.

In another feature of this aspect, the one or more client processors performs operations further comprising detecting the input by the user of a column filter criteria, initiating a column filter in the second grid to identify to the user one or more first assigned state items that matches the column filter criteria, identifying the first assigned state items that match the column filter criteria, and displaying the identified matching items to the user in the second grid.

Another aspect of the present invention relates to a client computing device comprising one or more client processors, and a non-transitory computer-readable medium storing a program having a graphical user interface (GUI) for controlling the retrieval of items from a server, the server for storing a large collection of data sets and accessed by a user through the computing device, the GUI including a first and second grid. The program for execution by the one or more client processors to perform operations comprising initiating a service call to the server, the service call including a filter criteria input by the user in the second grid, receiving filtered items retrieved by the server from the collection of data sets that include a first assigned state, displaying the received filtered items in the second grid, identifying one or more filtered items selected by the user, receiving an indication from the user to move the one or more selected items from the second grid to the first grid, moving the one or more selected items, wherein the moved items first assigned state is changed to unassigned, displaying in the first grid the unassigned items, detecting the selection of one or more unassigned items by the user; and moving the selected unassigned items to the second grid, wherein the unassigned state is changed to a second assigned state.

In a feature of this aspect, the one or more client processors performs operations further comprising separating first grid existing items in the first grid from the moved items, detecting the selection by the user to save the moved items in the first grid, and eliminating the separation between the first grid existing items and the moved items, wherein the first grid existing items' state is unassigned.

In another feature of this aspect, the second grid includes filtered items including a second assigned state.

In another feature of this aspect, the one or more client processors performs operations further comprising separating the selected unassigned items moved from the first grid from the second assigned state filtered items, detecting the selection by the user to save the moved items in the second grid, eliminating the separation between the first grid existing items and the moved items, and changing the unassigned state to the second assigned state for each unassigned item moved from the first grid.

In another feature of this aspect, the GUI further includes one or more paging controls comprising an item display count for defining by the user the number of filtered items to be displayed per page in the respective first and second grids, and a page indicator for navigating between multiple pages of filtered items.

In another feature of this aspect, the one or more client processors performs operations further comprising navigating between the multiple pages in the second grid, and identifying one or more filtered items selected by the user as the user navigates between the multiple pages.

In another feature of this aspect, the moved items are displayed to the user in the first grid as the user navigates between the multiple pages in the second grid.

In another feature of this aspect, the one or more client processors performs operations further comprising detecting the input by the user of a column filter criteria, initiating a column filter in the second grid to identify to the user one or more first assigned state items that matches the column filter criteria, identifying the first assigned state items that match the column filter criteria, and displaying the identified matching items to the user in the second grid.

Another aspect of the present invention relates to a non-transitory computer readable medium storing a program having a graphical user interface (GUI) for controlling the retrieval of items from a server. The server for storing a large collection of data sets and accessed by a user through the computing device. The GUI comprising a first and second grid for receiving and filtering a plurality of items from the server based on a first criteria set by the user. The program for execution by one or more processors to perform operations comprising initiating a service call to the server, the service call including a filter criteria input by the user in the second grid, receiving filtered items retrieved by the server from the collection of data sets that include a first assigned state, displaying the received filtered items in the second grid, identifying one or more filtered items selected by the user, receiving an indication from the user to move the one or more selected items from the second grid to the first grid, moving the one or more selected items, wherein the moved items first assigned state is changed to unassigned, displaying in the first grid the unassigned items, detecting the selection of one or more unassigned items by the user, and moving the selected unassigned items to the second grid, wherein the unassigned state is changed to a second assigned state.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

FIG. 5 is an illustration of an example of an implementation of an Assigned Grid including a context menu in accordance with the present invention;

FIG. 9 is an illustration of an example screen shot of a Big Data Selector in accordance the disclosed implementation of the present invention;

FIG. 15 is an illustration of an example screen shot of a refreshed Big Data Selector when the User changes the "Table" drop down;

FIG. 16 is an illustration of an example screen shot of selected items moved to the "Assigned" grid;

FIG. 17 is an illustration of an example screen shot showing the saved state of the example Big Data Selector o FIG. 16.

DETAILED DESCRIPTION

Figure 1:
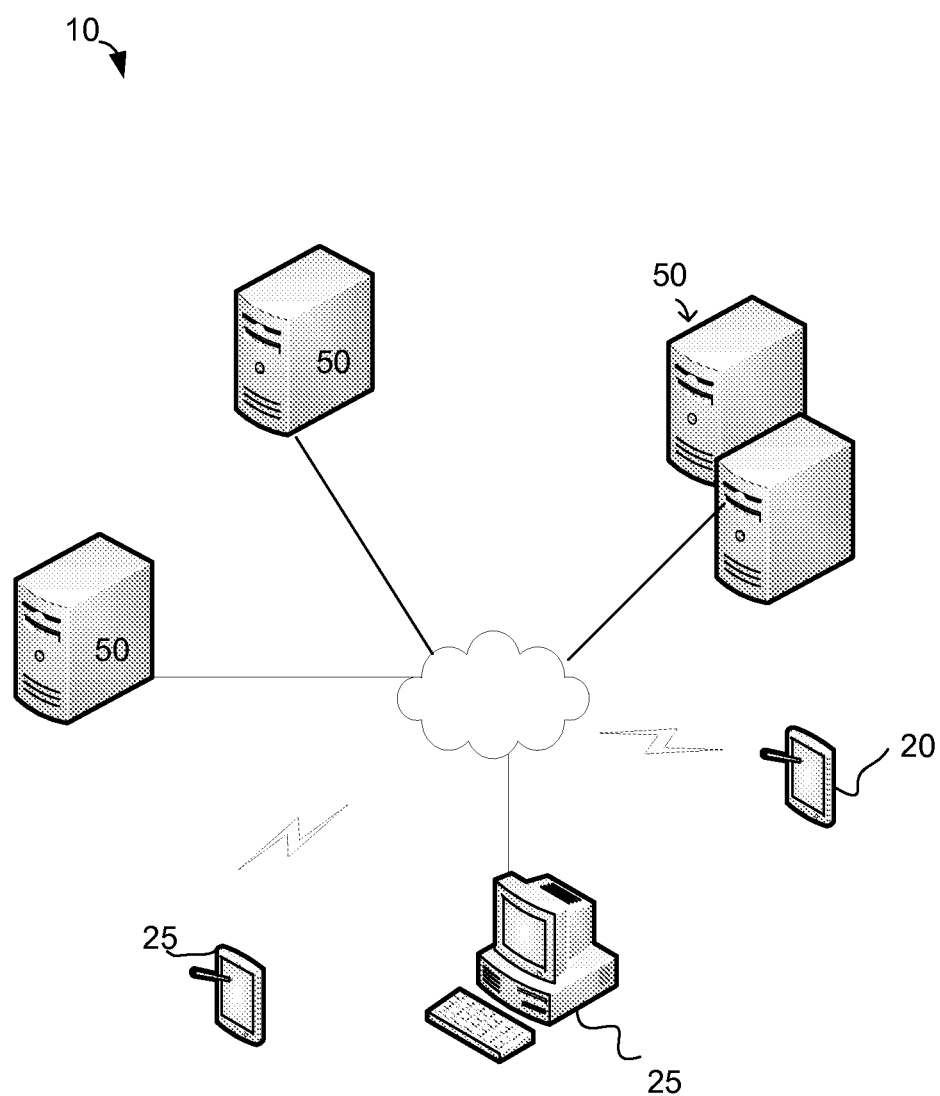
FIG. 1 is an illustration of an example diagram of a disclosed implementation of a system including a Big Data Selector in accordance with the present invention.

Referring now to the drawings, one or more preferred embodiments of the present invention are next described. The following description of one or more preferred embodiments is merely exemplary in nature and is in no way intended to limit the invention, its implementations, or uses.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

An example diagram of a disclosed implementation of a system including a Big Data Selector is illustrated in FIG. 1. The system 10 includes one or more remote servers 50 and one or more computing devices 20, 25. The remote servers 50 store a large and complex collection of data sets that is difficult to process using traditional data processing applications (i.e., Big Data). The servers 50 may be a part of a private network wherein the servers are stored in a facility for which the user is associated or included in the "Cloud" wherein a user accesses the server(s) 50 via a Cloud application.

Figure 2:
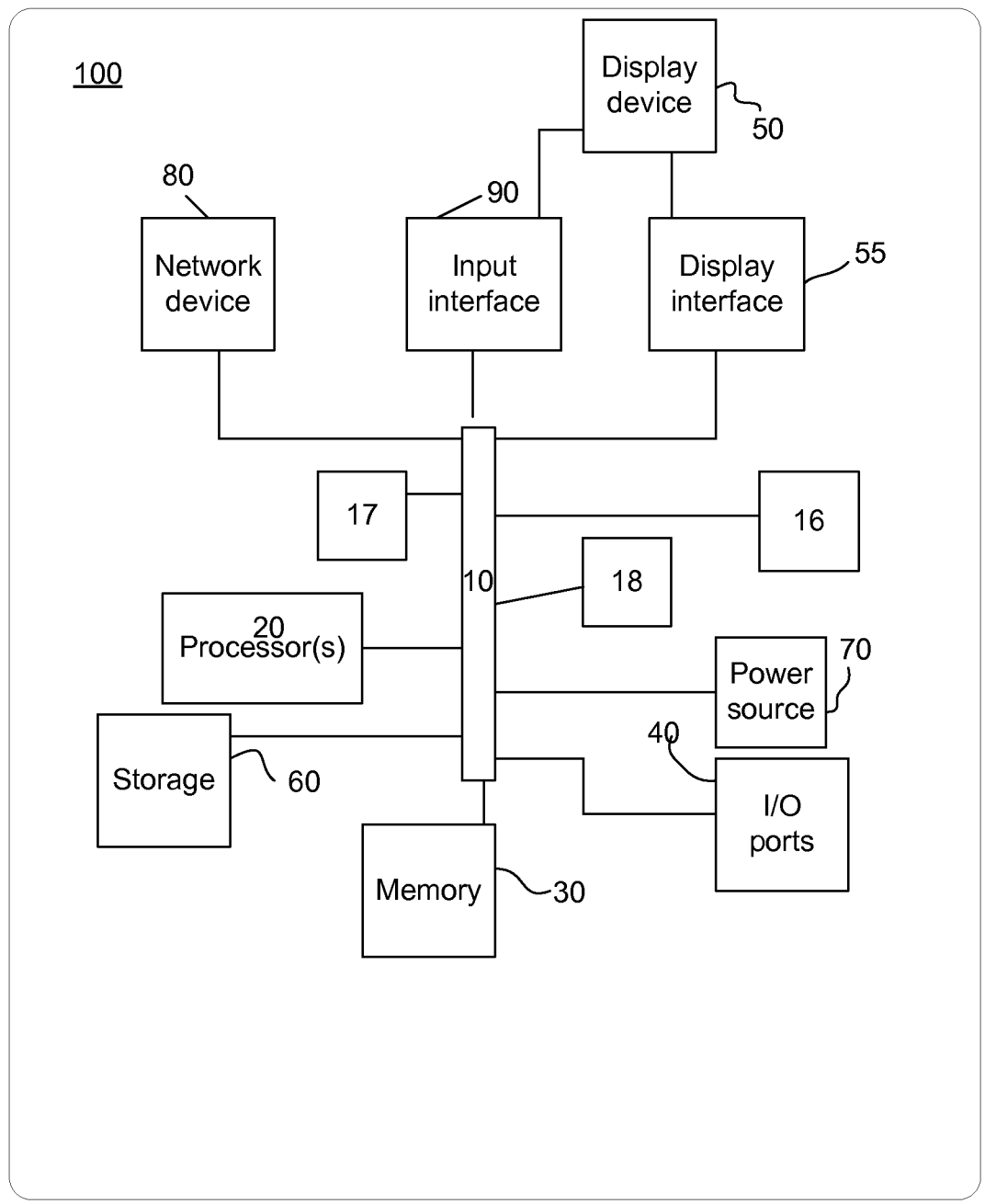
FIG. 2 is an illustration of an example block diagram of an implementation of a computing device in accordance with the present invention.

An example of a suitable computing device operable in accordance with an implementation of the disclosed system and method is illustrated in FIG. 2. It should be noted that the various functional blocks shown in FIG. 2 may include hardware elements, software elements (including computer code or instructions stored on a non-transitory machine-readable medium) or a combination of both hardware and software elements. The computing device 100, may be implemented in different forms. For example, the computing device 100 may be implemented as a server, group of servers, a desktop computer, laptop, workstation, personal digital assistant (PDA) and other appropriate computers. The computing device 100 includes a bus 10, display interface 55, display device 50, I/O ports 40, Input interface 90, data processing circuitry, such as one or more processors 20, a memory device 30, a non-volatile storage 60, a networking device 80 and a power source 70.

The computing device may also be implemented as a mobile computing device. The mobile computing device may be implemented by various mobile devices, such as PDAs, cellular phones, smart phones, tablets and other similar computing devices. The mobile computing device includes a bus, a display, I/O ports, Input displays, one or more processors, a memory device, a non-volatile storage, a networking device, a power source, and a transceiver for implementing wireless communication under various protocols, such as SMS or MMS messaging, CDMA, TDMA, WCDMA or GPRS, among others. The components of the computing devices as shown, their connections and relationships and their functions are meant for exemplary purposes only, and are not meant to limit implementations of the disclosed inventions described and/or claimed in this disclosure.

The display device 50 may be used to display images generated by the computing device 100, for example a graphical user interface (GUI). The display 50 may be any type of display such as a cathode ray tube (CRT), a liquid crystal display (LCD), a light emitting diode (LED) display, or other suitable display. In certain implementations of the computing device 100, the display 50 may include a touch-sensitive element, such as a touch screen.

The processor(s) 20 may provide data processing capability to execute and support one or more operating systems, computer programs, user and application interfaces, software systems and applications, and any other functions of the computing device 100 that may be stored in the memory device 30 or on the storage device 60. The processor(s) 20 may include one or more microprocessors, such as one or more "general-purpose" microprocessors, one or more special-purpose microprocessors and/or ASICS, for example.

The processor(s) 20 may communicate with a user through input interface 90 and display interface 55 coupled to the display 50. The display interface 55 may comprise appropriate circuitry for driving the display 50 to present graphical and other information to a user. The input interface 90 may receive commands from a user and convert them for submission to the processor 20.

The instructions or data to be processed by the processor(s) 20 may be stored in a memory 30. The memory 30 may be provided as a volatile memory, such as random access memory (RAM), and/or as a non-volatile memory, such as read-only memory (ROM). The memory 30 may store a variety of information and may be used for various purposes. For example, the memory 30 may store firmware executed by a processor 20 (such as for implementing a system and method for selecting items from a server storing "Big Data" as discussed herein), other programs that enable various functions of the computing device 100, user interface functions, processor functions. The memory 30 may also be another form of computer-readable medium.

The components may further include a non-volatile storage 22 for persistent storage of data and/or instructions. The non-volatile storage 22 may include flash memory, a hard drive, or any other optical, magnetic, and/or solid-state storage media. The non-volatile storage 22 may be used to store data files, software, wireless connection information (e.g., information that may enable the electronic device 100 to establish a wireless connection, and any other suitable data. In addition, the non-volatile storage 60 may also store code and/or data for implementing various functions of the electronic device 100, such as application or program code, data associated with such applications or programs, operating system code, user configured preferences, as well as code for implementing a system and method for selecting items from a server storing "Big Data" as discussed herein. In implementation, the storage device 60 may be or contain a computer-readable medium. A computer program product can be tangibly embodied in an information carrier. The computer program products may also contain instructions that, when executed, perform one or more methods, such as those described above. The information carrier is a computer- or machine-readable medium, such as the memory 30, the storage device 60, memory on processor 20, or a propagated signal.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The disclosed system and methods are preferably implemented by software, hardware, or a combination of hardware and software. The disclosed implementations can include implementation in one or more computer programs that are executable and/or interpretable on a programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in an appropriate programming language. As used herein, the terms "machine-readable medium" "computer-readable medium" refers to any computer program product, apparatus and/or device (e.g., magnetic discs, optical disks, memory) used to provide machine instruction and/or data to a programmable processor. The computer readable medium can also be distributed over network-coupled computer systems so that the computer readable code is stored and executed in a distributed fashion.

A user-interface (UI) (i.e., Big Data Selector, hereinafter BD Selector) that allows a user to quickly find and select (or assign) specific items from a large data source is disclosed. The UI control provides the user with a display that indicates what items have been selected and server side paging so that the control can be used in a disconnected manner. The control also allows the user to filter each grid by typing in search criteria that is then sent to the server to further speed up finding data in a table that could potentially have millions of records. An example of big data may be public health records, patient specific health records, and/or other health related information.

Figure 3:
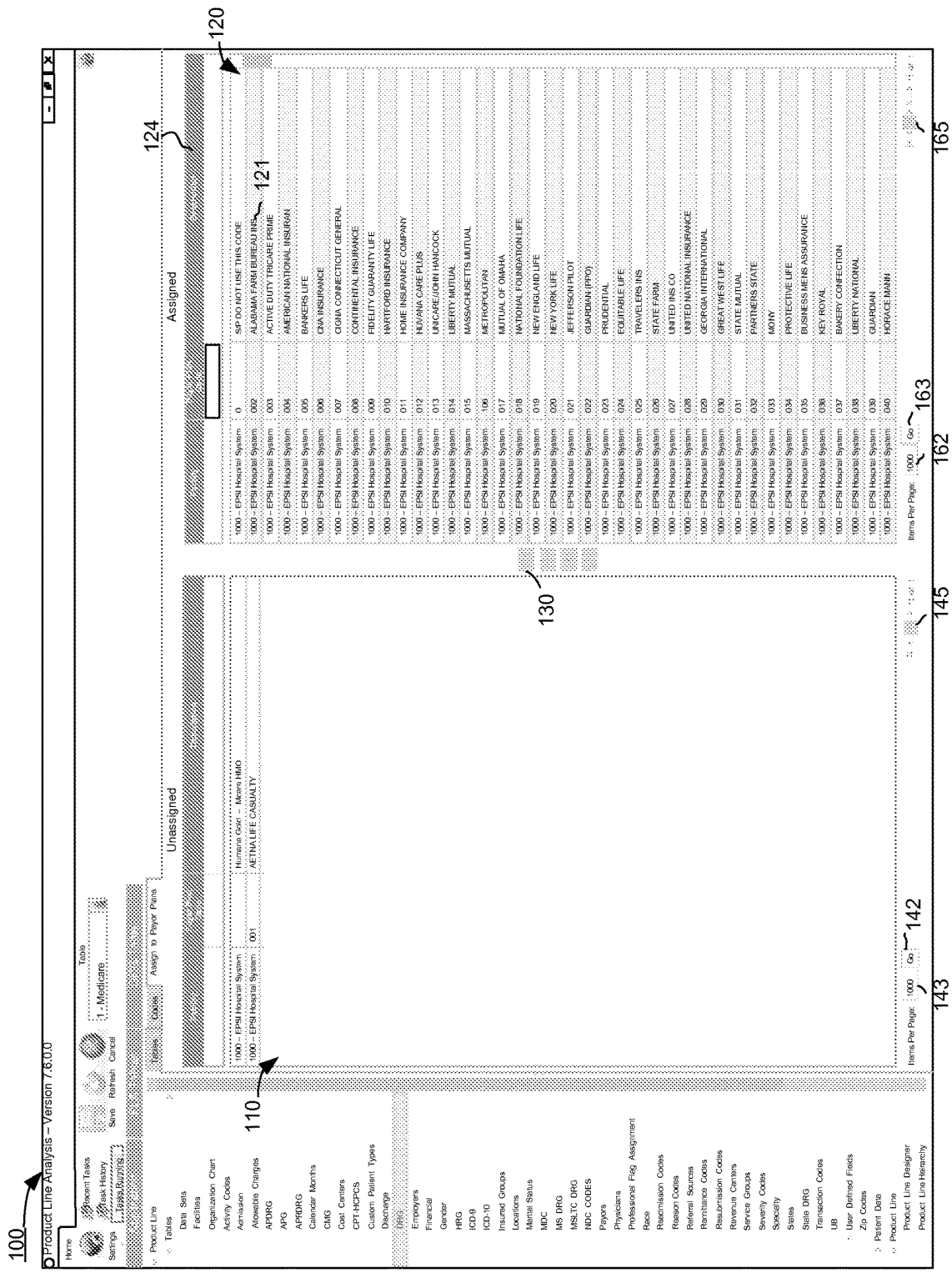
FIG. 3 is an illustration of an example implementation of the disclosed Big Data Selector in accordance with the present invention.

In accordance with an implementation of the disclosed system and method for accessing data housed remotely (e.g., in the cloud), a use interface (UI) control is provided to a user to allow the User to assign/unassign items from a specific state to another state within a computing environment. An example illustration of an implementation of the BD Selector 100 is shown in FIG. 3. The BD Selector 100 comprises a first and second grid 110, 120, respectively, and a plurality of control buttons 130. The BD Selector's 100 may perform server side filtering and sorting, client side filtering and sorting as well as server side paging.

In accordance with an implementation of the UI control 100, the first grid 110 (i.e., "Unassigned" grid), includes unassigned items that have not been selected for inclusion in the data extraction from the server side database.

The second grid 120 (i.e., "Assigned" grid), in the UI control 100, includes the assigned items that were selected for inclusion in the data extraction from the server side database. The assigned items grid 120 includes the items that are displayed to the User. The items 121 that are displayed in the assigned item grid 120 are a subset of the large amount of data that is available in the server.

Figure 4:
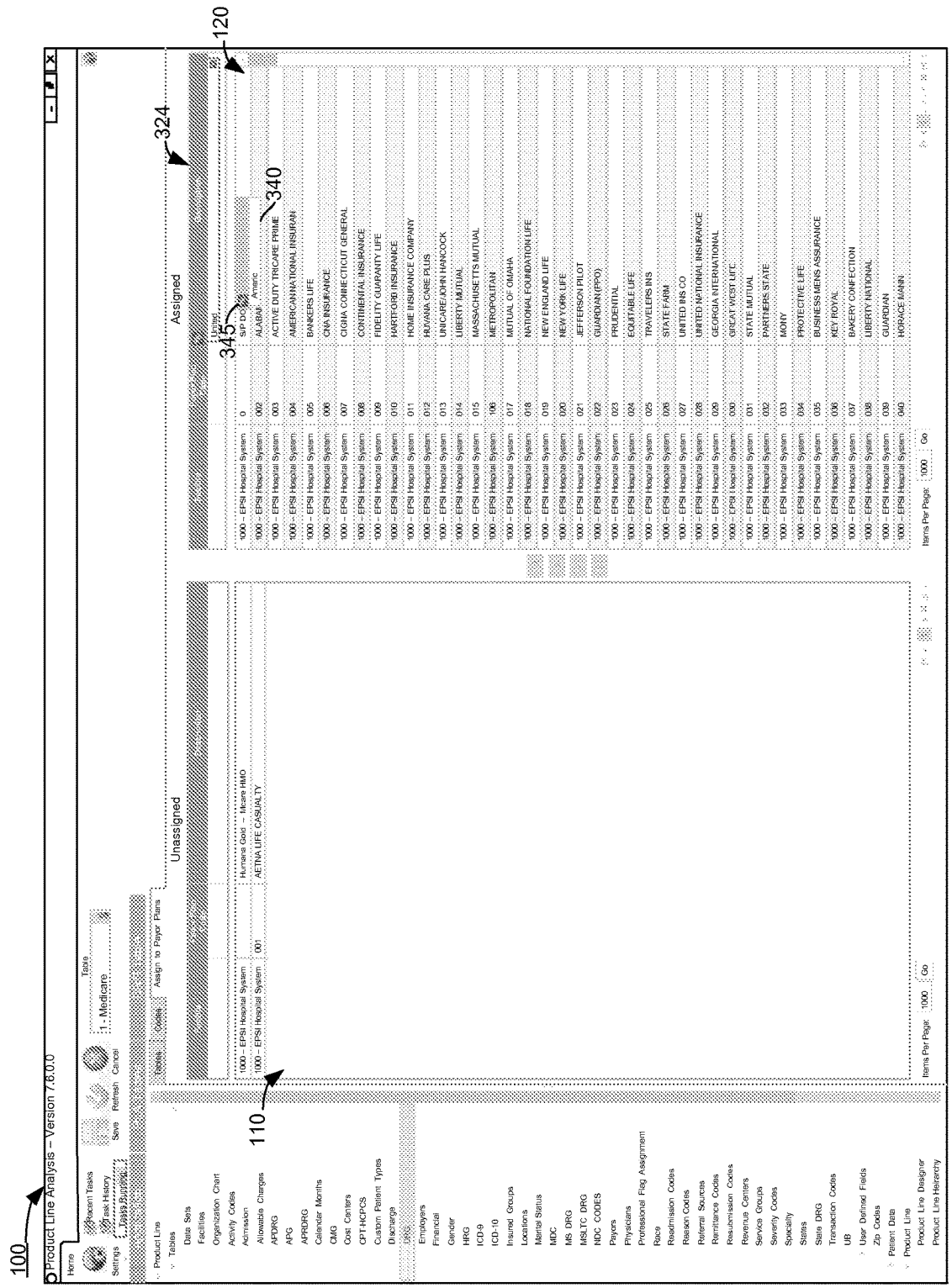
FIG. 4 is an illustration of an example implementation of the filter functionality of the disclosed Big Data Selector in accordance with the present invention.

The Unassigned and Assigned grids 110, 120 each have the functionality to page and filter the data included in the respective grids 110, 120. This functionality is performed via a web service call to the server. The User initiates this functionality by typing in filter criteria in the row at the top of each column the respective grid 110, 120 or by clicking on the column header to sort the data in the grid. An example of the filter functionality is illustrated in FIG. 4. As illustrated, the User has selected the "Description" column 324 to filter the Assigned grid 120. A dropdown menu 340 is then displayed to the User that allows the User to enter search terms. Once a filter term is entered or a column is selected to sort, an action icon 345 is displayed in the column 324, indicating to the User that an action is required to apply the filtering/sorting.

Once the action icon 345 is visible to the User, the User can move the mouse over the icon and select from the context menu 446. An example of the Assigned Grid 120 including a context menu is illustrated in FIG. 5. As shown, the context menu 446 includes one or more commands that may be executed if selected by a User. From the context menu 446, the User can select to Apply or Clear a filter, Export the contents of the respective grid 110, 120 to Excel of PDF, as well as Print the contents of the respective grid 110, 120 illustrated in FIG. 3. If the User selects to Filter/Sort while server paging is in effect, a request is generated and sent to the server to provide the items based on the User's filter/sort criteria.

Figure 6:
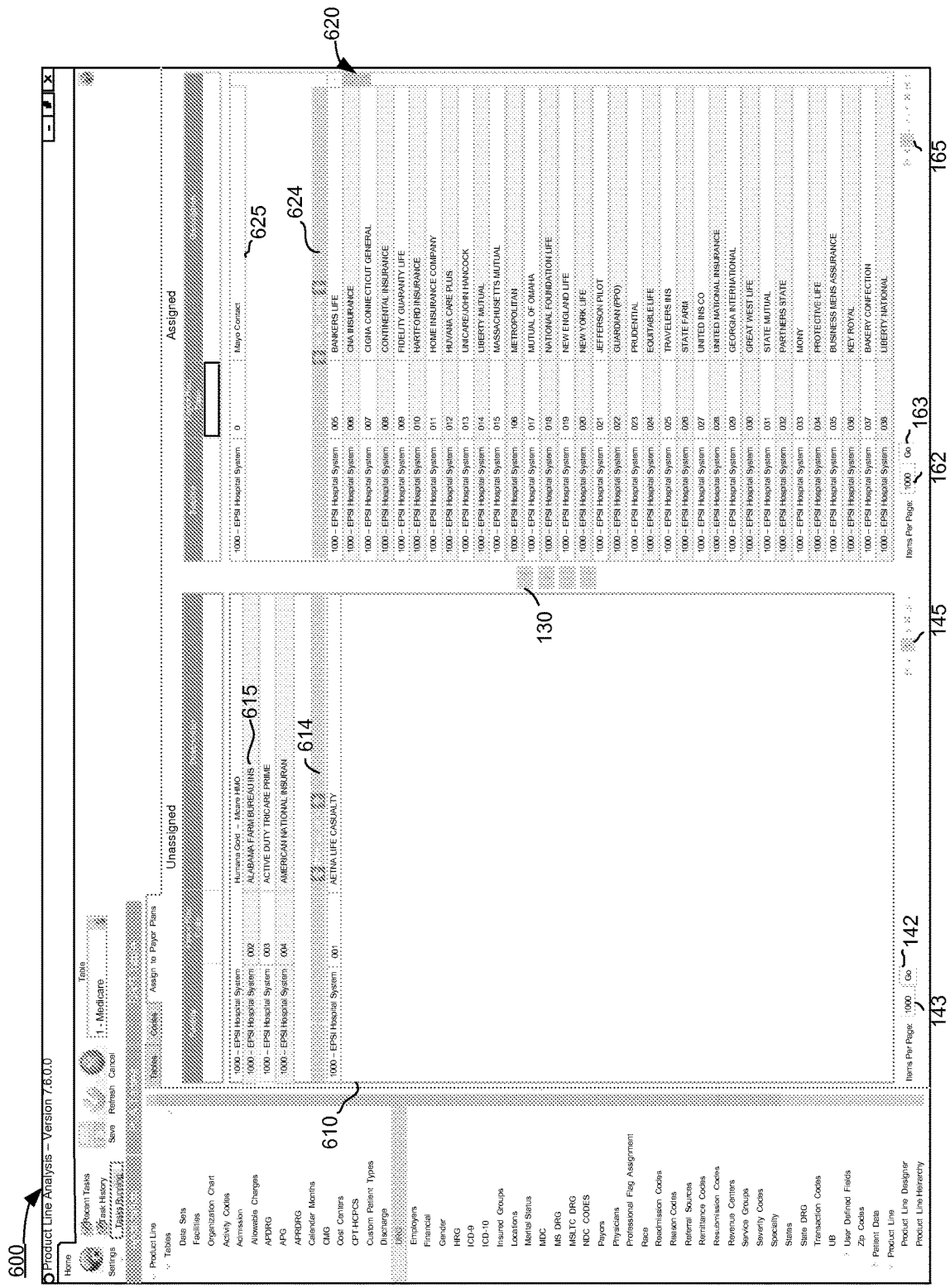
FIG. 6 is an illustration of an example screen shot of the Big Data Selector including pending moved items in accordance with the present invention.

Referring back to FIG. 1, items in each of the grids 110, 120 may be moved between the Assigned 120 and Unassigned 110 grids using the control buttons 130. When a User selects one or more items in a grid, the User may select the appropriate move button 130 to move the selected item(s) from one grid, e.g., Assigned grid 120, to the other grid, e.g., Unassigned grid 110. Once the User selects the appropriate control button 130, the selected items from the grid are deleted from the grid and moved to the other grid. In accordance with an implementation of the disclosed BD Selector 100, the moved items are appear in the opposite grid at the top to signify that the items have been moved but not committed to be saved. An example of a screen shot of BD Selector 600 including pending moved items in the Unassigned grid 610 that have been moved from the Assigned grid 620 and vice versa, is illustrated in FIG. 6. To assist the User with distinguishing pending items from previously stored items in the grid 110, 120, the respective grid 110, 120 displays a visual indication of those items that have been moved, but not saved. The visual indication 614, 624 in the example shown is a Pending Items splitter, which indicates that the items 615, 625, respectively, above the Pending Items splitter 614, 624 are pending. In accordance with a preferred implementation, the Pending Items splitter 614, 624 may be moved in a vertical direction to allow the User to see more or less of the items 615, 625 in each grid 610, 620, respectively.

Referring back to FIG. 1, each grid 110, 120 includes paging controls 142, 143, 145, 162, 163, 165. As illustrated in this example, the paging controls 142, 143, 145, 162, 163, 165 are located at the bottom of each of the grids 110, 120, respectively. Using the paging controls 142, 162, the User is able to decide how many items per page that should be displayed. After selecting the number of items, the User may then press the "Go" control button 143, 163 to perform a search on the data at the server (e.g., the cloud) to retrieve the amount of items selected. If the total number of items in the big data stored at the server is larger than the requested amount, page numbers 145, 165 are displayed. The page numbers 145, 165, as illustrated appear on the lower right portion of each grid so the User can click on them to retrieve more items via server side requests. The BD Selector 100 facilitates all of the functionality via web services that are written specifically for the data requested on the back end.

Figure 7:
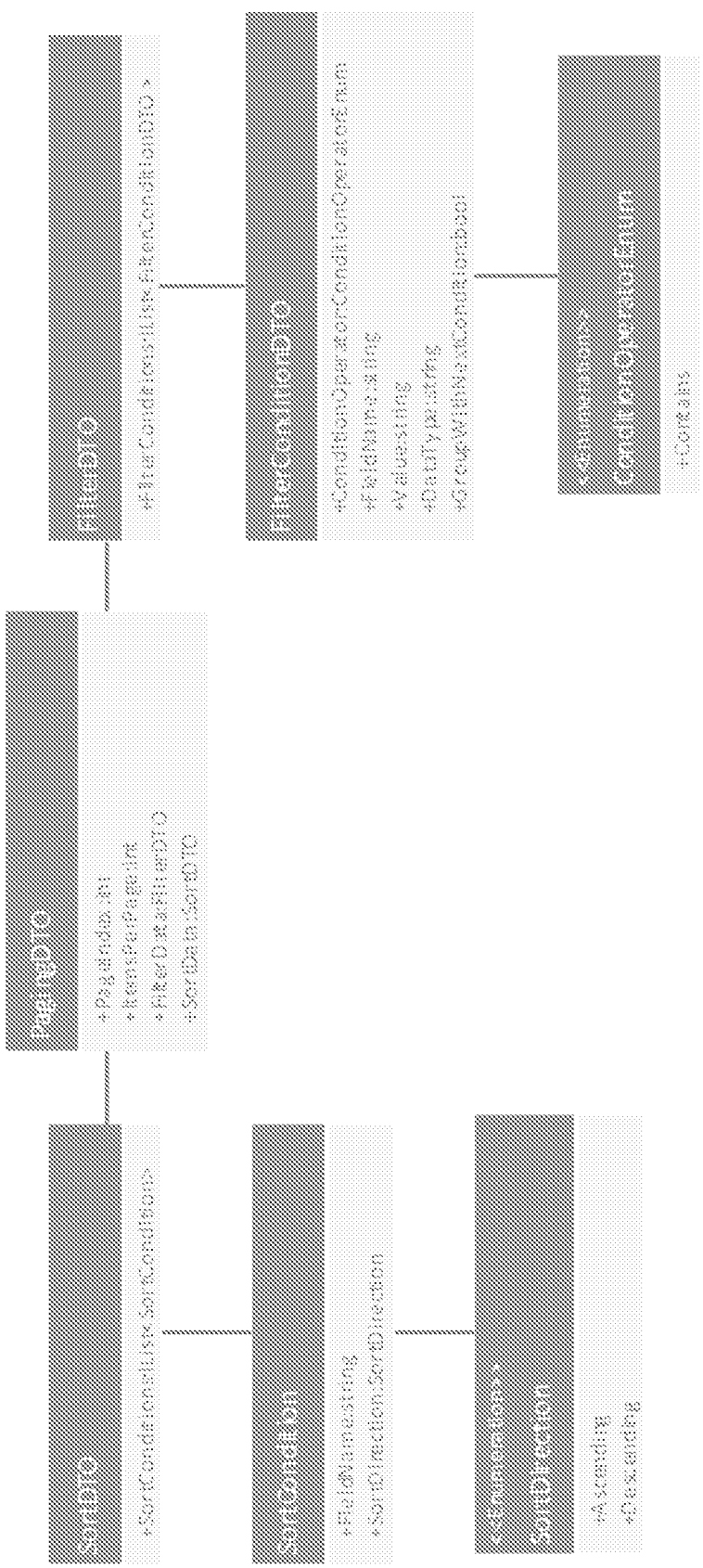
FIG. 7 is an illustration of an example class diagram of the disclosed Big Data Selector system and method in accordance with the present invention.

An example class diagram of the disclosed Big Data Selector system and method is illustrated in FIG. 7 showing the properties or metadata used to communicate back and forth from the UI 100 (i.e., client) to the server (e.g., cloud). The BD Selector alters the values of the properties communicated to the server so that the server knows what group of items to retrieve for displaying to the User of the BD Selector.

Figure 8:
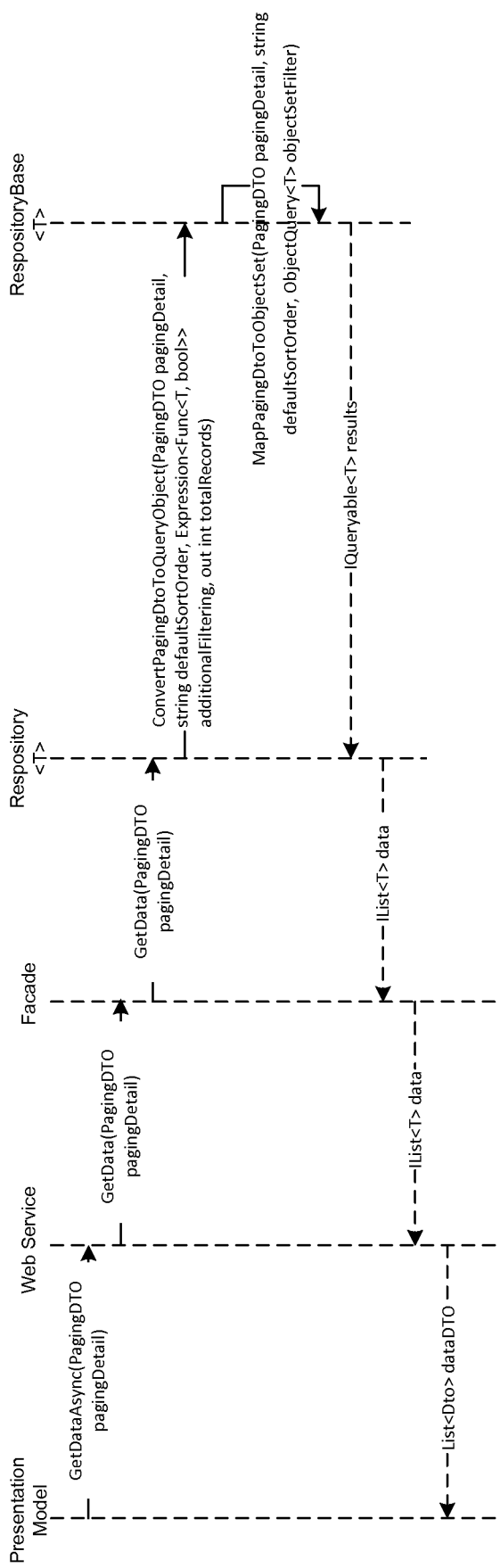
FIG. 8 is an illustration of an example sequence diagram of an implementation of the operation for retrieving items from a server by the disclosed Big Data Selector system and method in accordance with the present invention.

An example sequence diagram of an implementation of the operation for retrieving items from a server by the disclosed BD Selector system and method is illustrated in FIG. 8. The logic in RepositoryBase<T> takes the string criteria in PagingDTO and dynamically creates a LINQ to a SQL expression. In addition to creating a LINQ to SQL expression to get a chunk of data based on the index and size it includes filtering and sorting.

Figure 9:
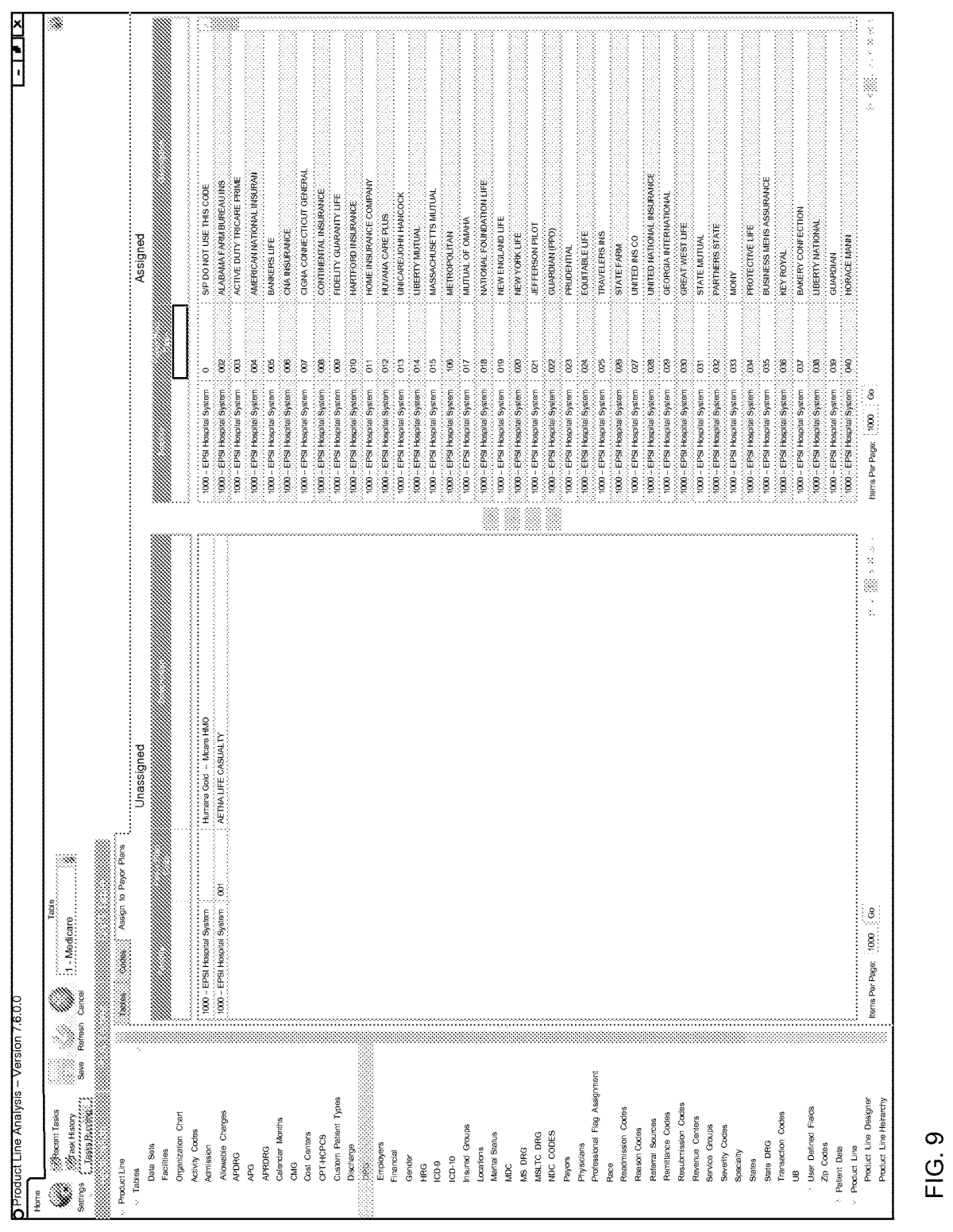

In accordance with an example implementation of the disclosed BD Selector, a BD Selector is provided to a User for changing items that have been stored in the system, the items were retrieved from a remote server (e.g., a server in the cloud) that is storing a large and complex collection of data sets that is difficult to process using traditional data processing applications (i.e., Big Data). An example screen shot of a Big Data Selector in accordance the disclosed implementation is illustrated in FIG. 9. The system shown is an example of how a Product Line Analysis Administrator application can make a change that directly affects a report that would be used by a Financial Manager or Chief Officer. FIG. 9 shows an initial state of the system. A DRG—Assign to Payor Plans screen is shown. Notice in the screen show that a "Table" drop down in the ribbon of the application has a value of "1—Medicare", a first criteria.

Figure 10:
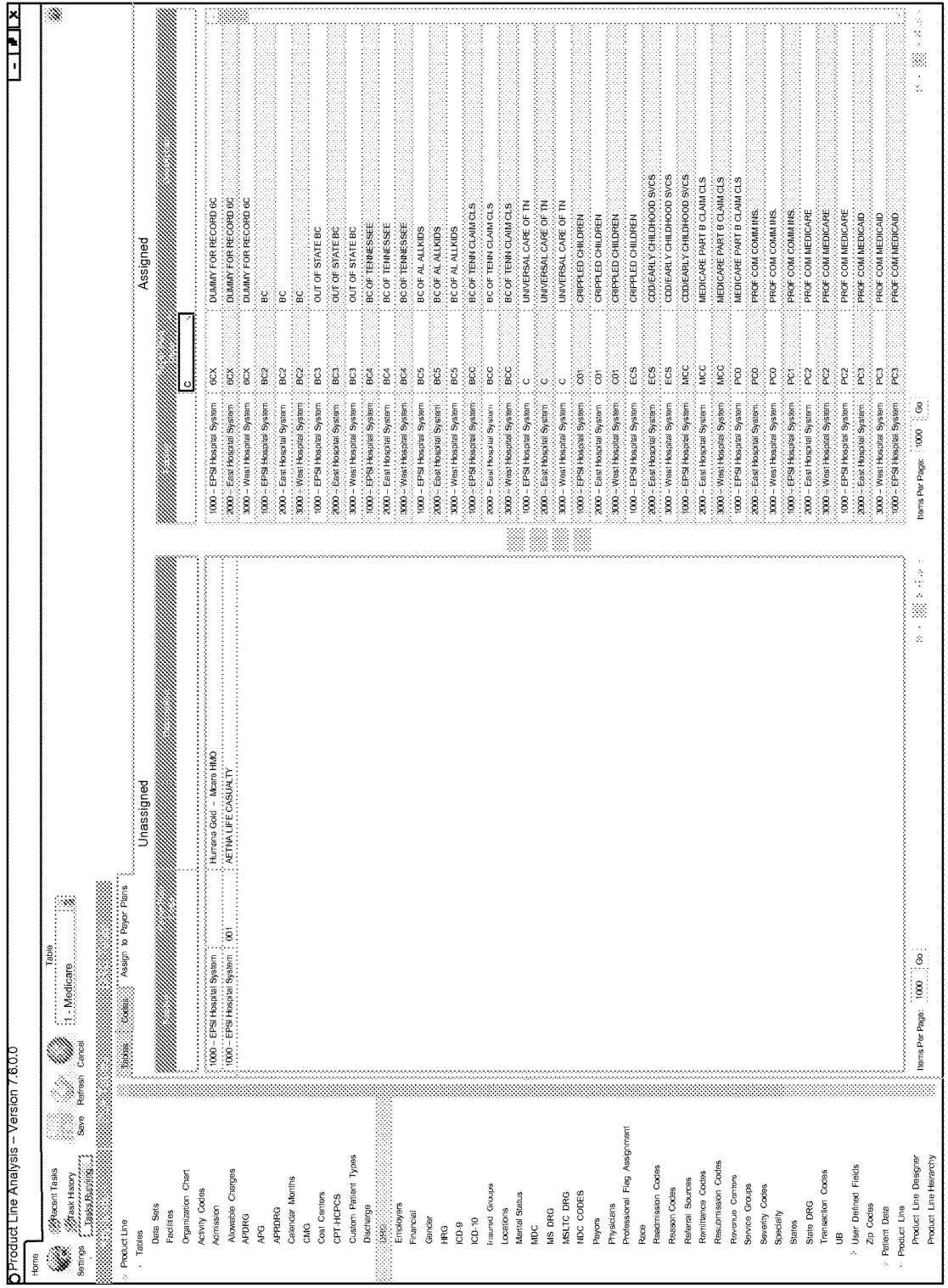
FIG. 10 is an illustration of an example screen shot of the Big Data Selector shown in FIG. 9 wherein the User has elected to filter the "Assigned" grid of the Big Data Selector in accordance with the present invention.

As disclosed, the User may filter the items that are displayed in each grid. FIG. 10 illustrates an example of the BD Selector shown in FIG. 9 wherein the User has elected to filter the "Payor Plan Code" column by "c" of the "Assigned" grid of the Big Data Selector.

Figure 11:
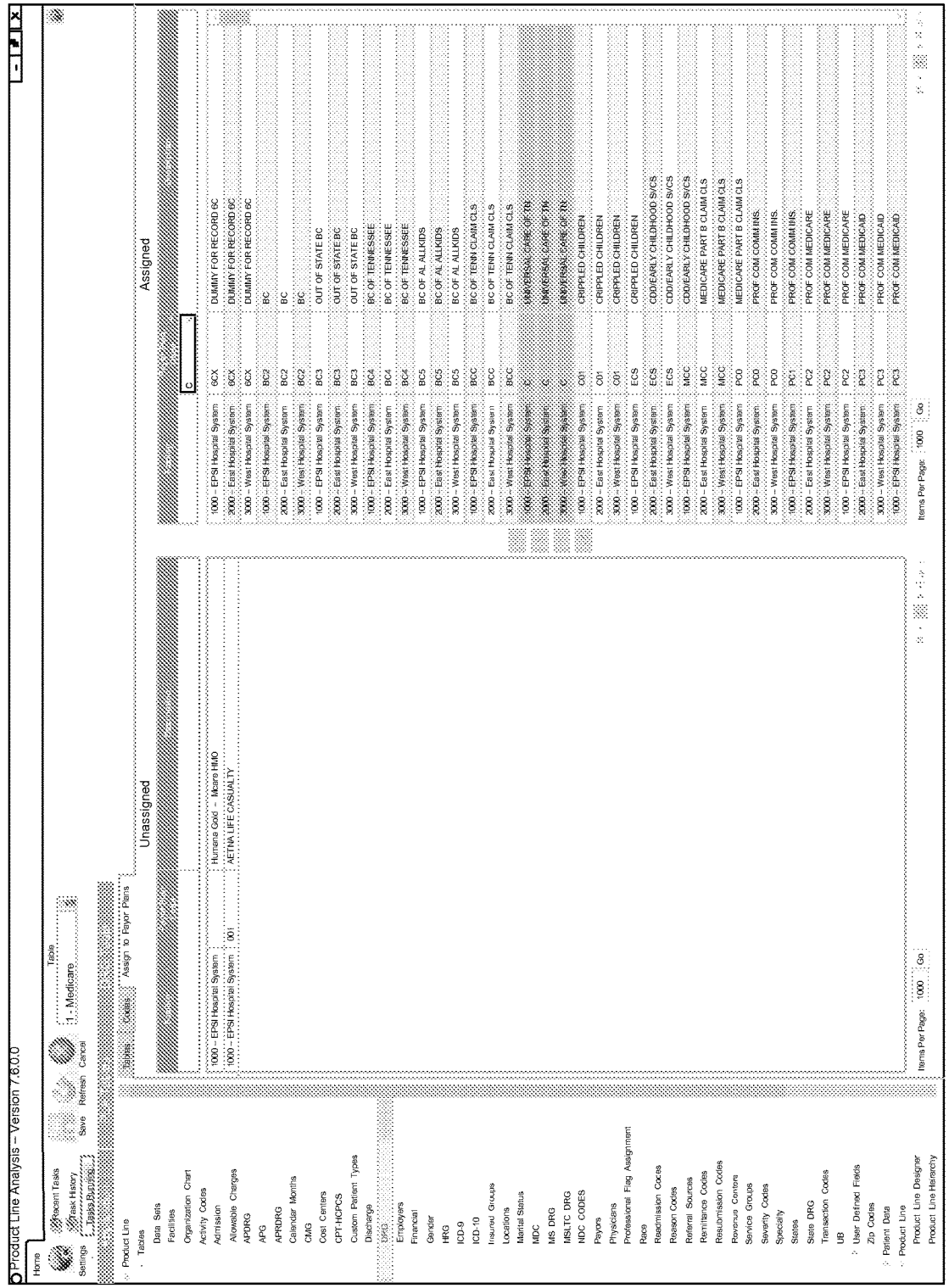
FIG. 11 is an illustration of an example screen shot of the Big Data Selector once the filter of FIG. 10 has been applied.
Figure 12:
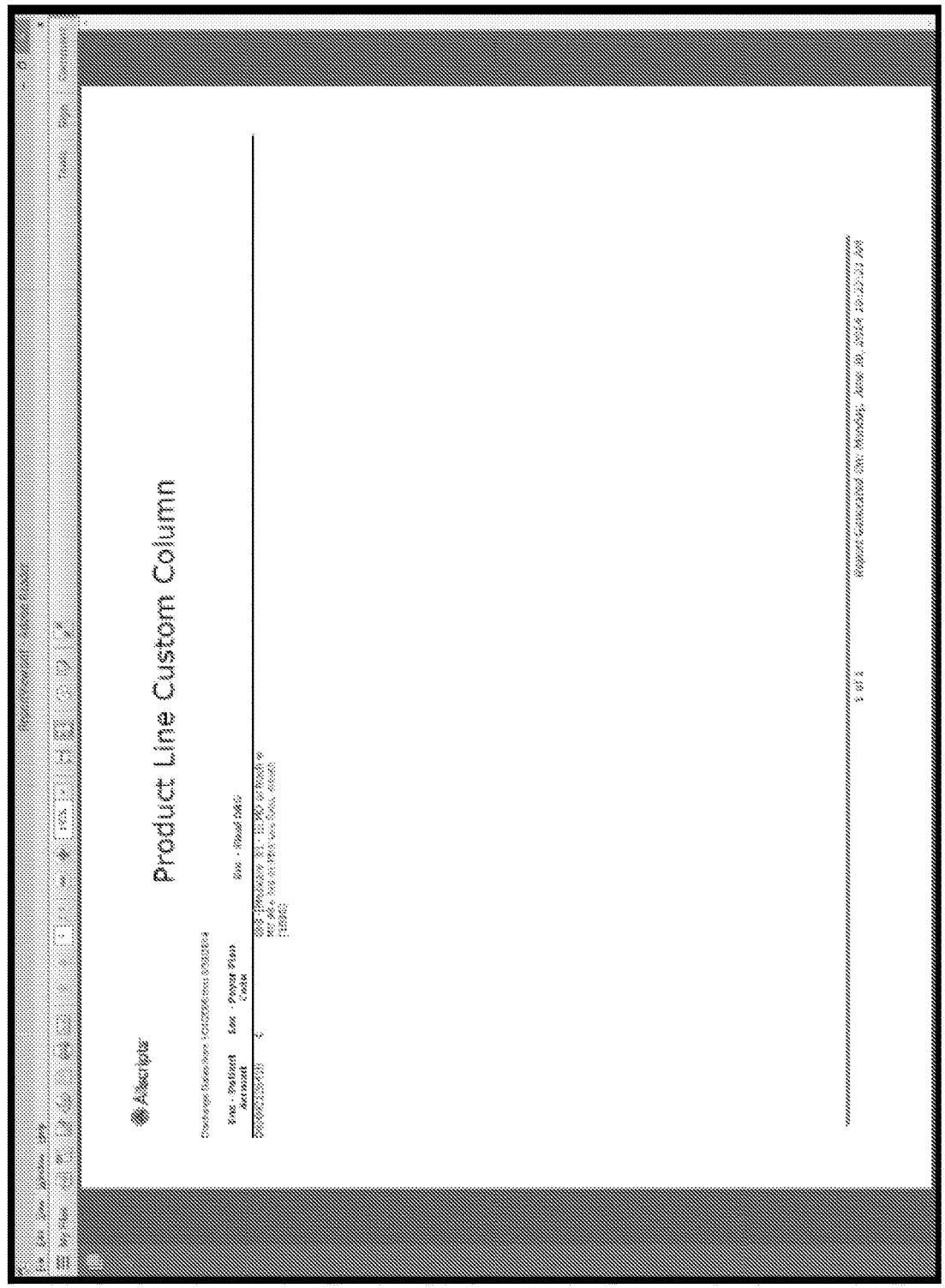
FIG. 12 is an illustration of an example screen shot of a report printed from the Big Data Selector illustration in FIG. 11.

Based on the User's elected filter, items in the respective grid are highlighted for the User. FIG. 11 is an example screen shot of the BD Selector once the filter has been applied. The three items highlighted are the result of the applied filter in the Selector. FIG. 12 is an example report that was generated reflecting the filtered Payor Plan assignment.

Figure 13:
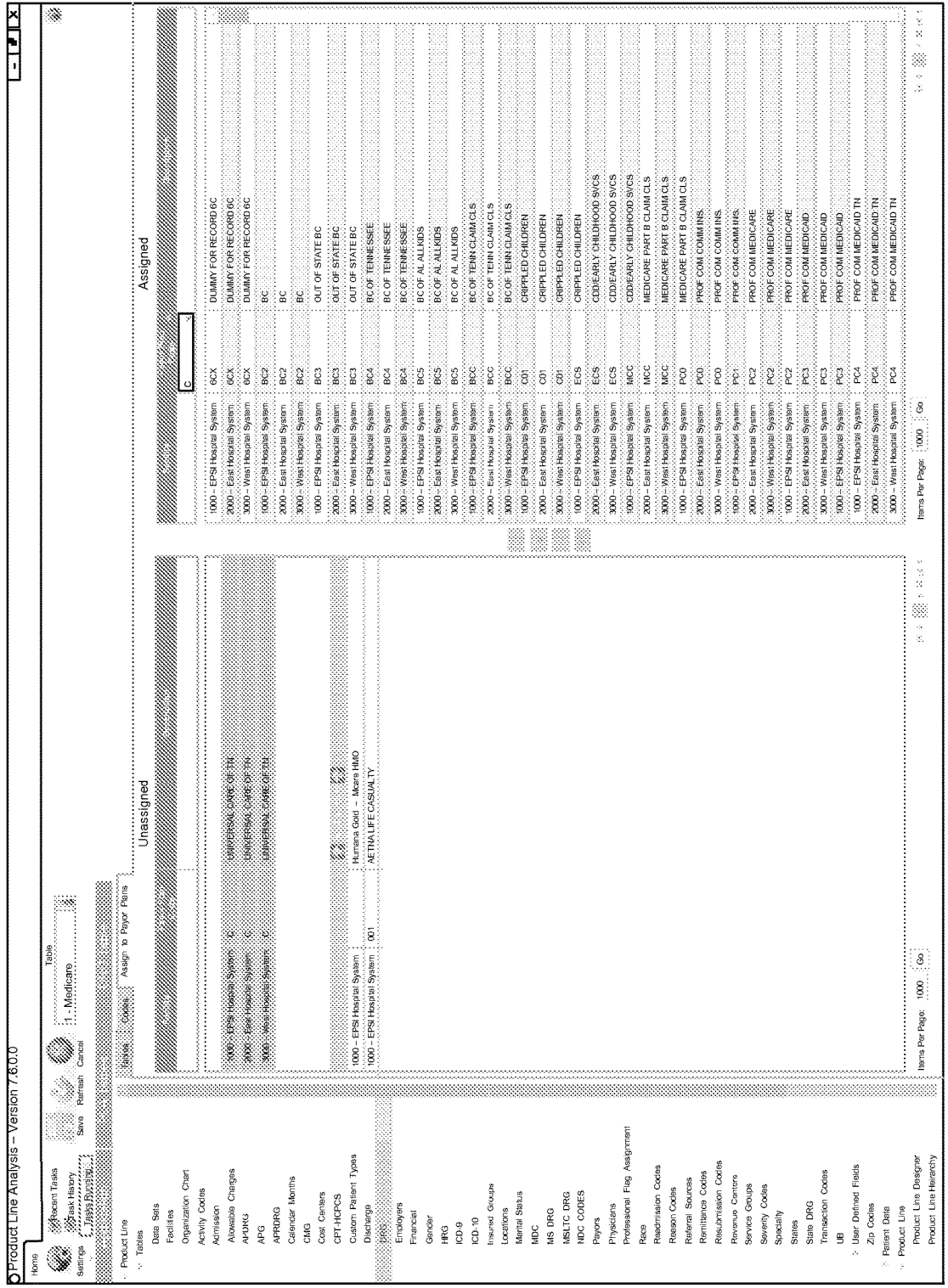
FIG. 13 is an illustration of an example screen shot of the Big Data Selector of FIG. 11 after the User has moved the highlighted items to the "Unassigned" grid.

The User may now move the highlighted items to the "Unassigned" grid and go to the next page in the "Assigned" grid to continue filtering the items that were retrieved from the server. By moving the highlighted items to the "Unassigned" grid, the User maintains a visual of the items that meet the User's filter criteria. If the User does not move the highlighted items, the User would have to return to page 1 of the retrieved items in order to view again. An example screen shot of the Selector after the User has moved the highlighted items to the "Unassigned" grid is illustrated in FIG. 13.

Figure 14:
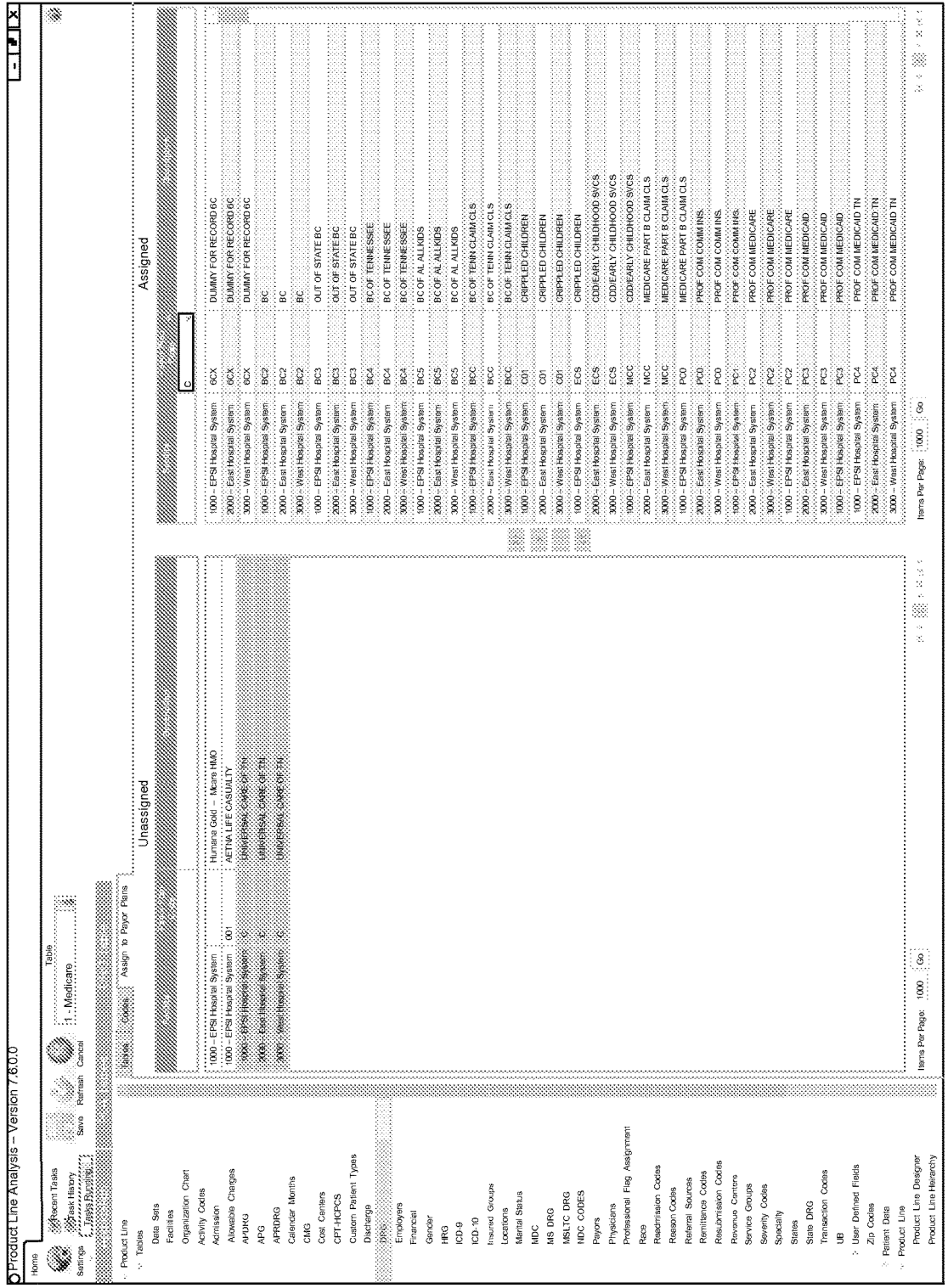
FIG. 14 is an illustration of an example screen shot showing the saved state of the Big Data Selector shown in FIG. 13.

As set forth above, when the User initially moves selected items from the "Assigned" grid to the "Unassigned" grid, vice versa, the items are placed in the "Unassigned" grid above a Pending Items bar in a pending state. In order to commit this move, the "Save" button in the ribbon of the application must be clicked by the User. FIG. 14 illustrates an example screen shot showing the saved state of the disclosed Big Data Selector.

Figure 15:
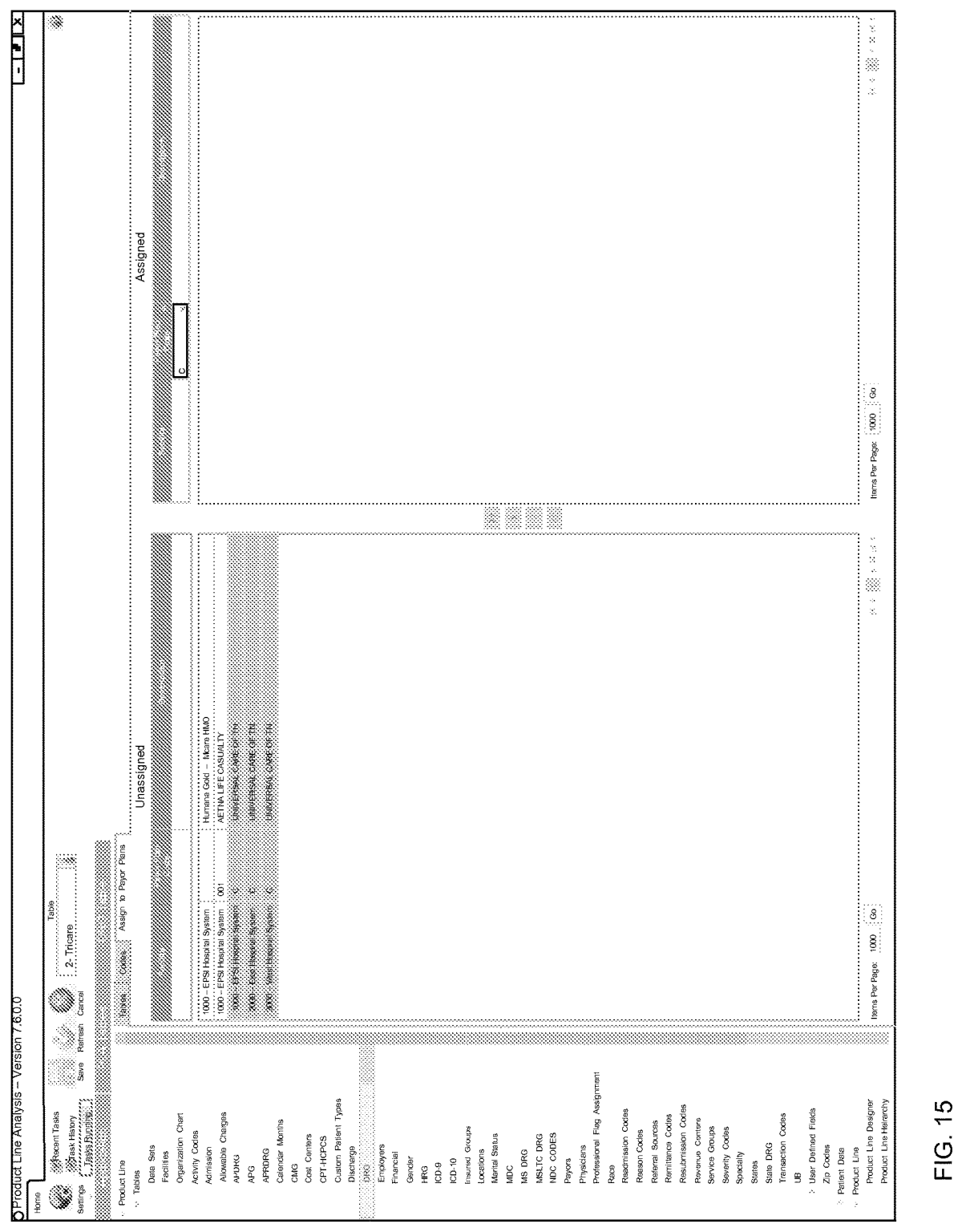
Figure 16:
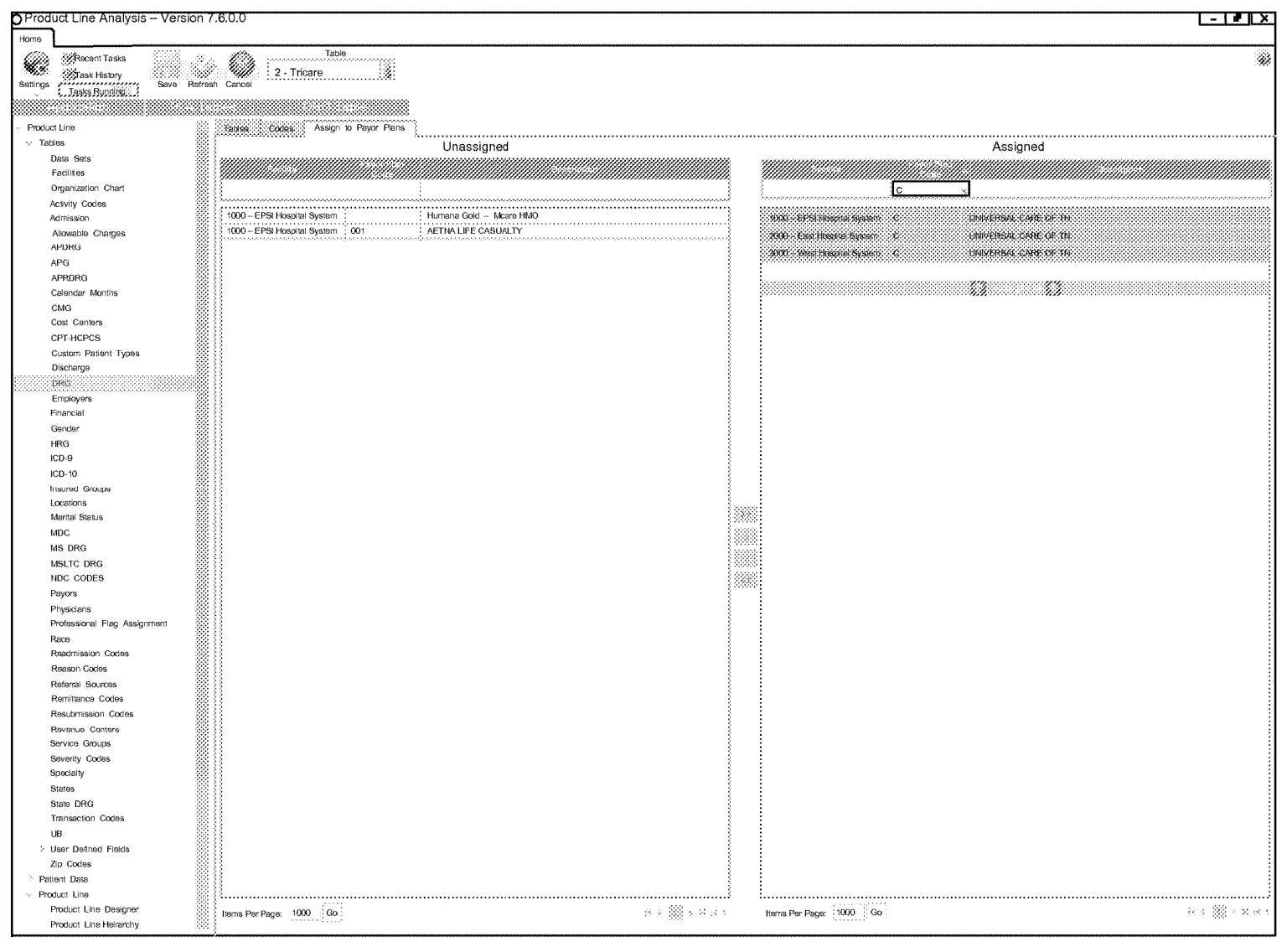

FIG. 15 is an example screen shot of the refreshed Big Data Selector when the User changes the "Table" drop down value to "2—Tricare". The three items that were moved to "Unassigned" are now available for assignment to the Tricare table. In order to move the items to the "Assigned" grid, the items are selected and moved by clicking the ">" control button. FIG. 16 is an example screen shot illustrating the movement of the selected items to the "Assigned" grid.

Figure 17:
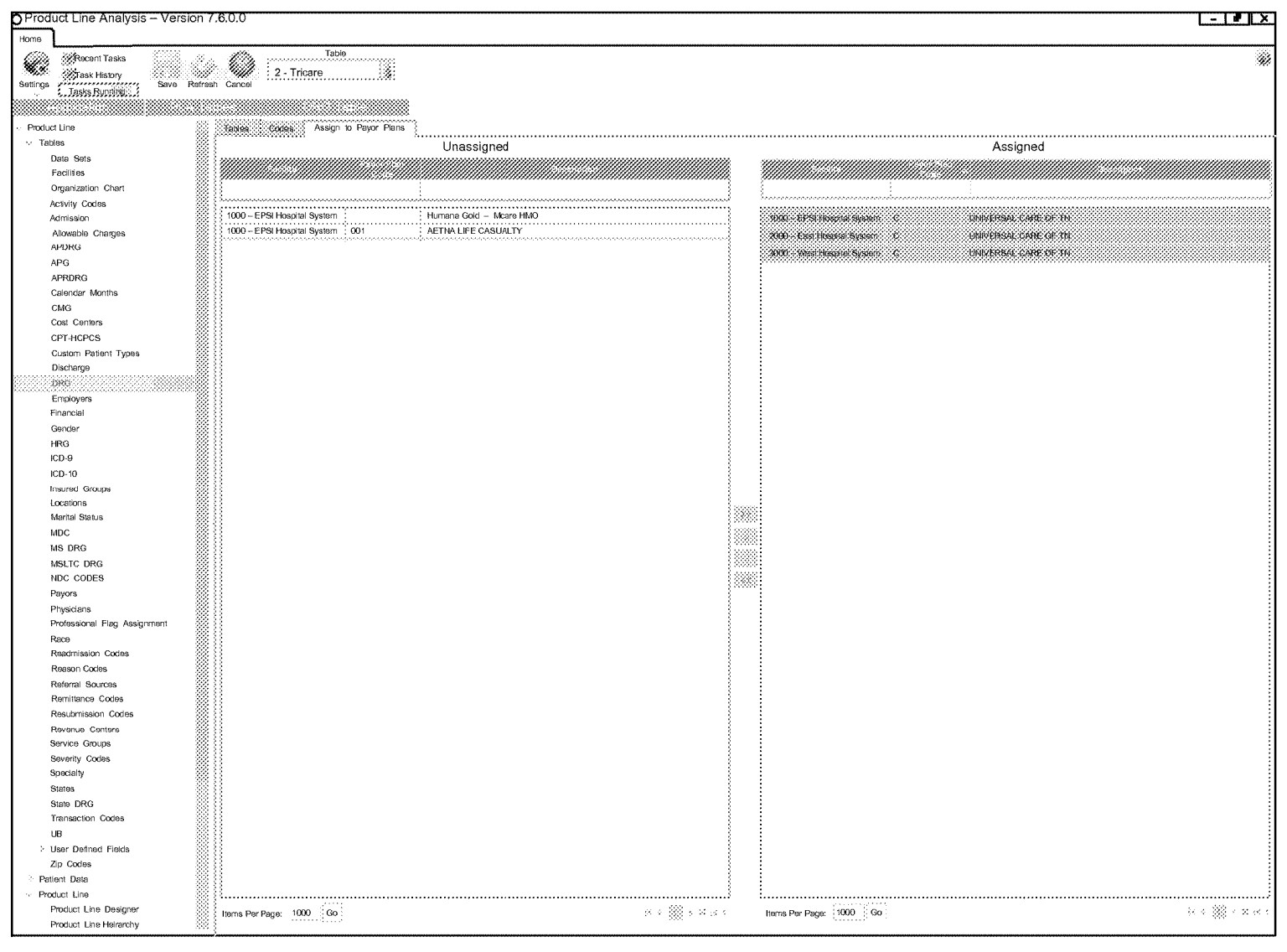

Again the example Big Data Selector shows the selected items in a pending state confirming that the change was made. In order to commit this change the "Save" button on the application's ribbon is clicked. FIG. 17 is a screen shot illustrating the saved state of the example Big Data Selector.

Figure 18:
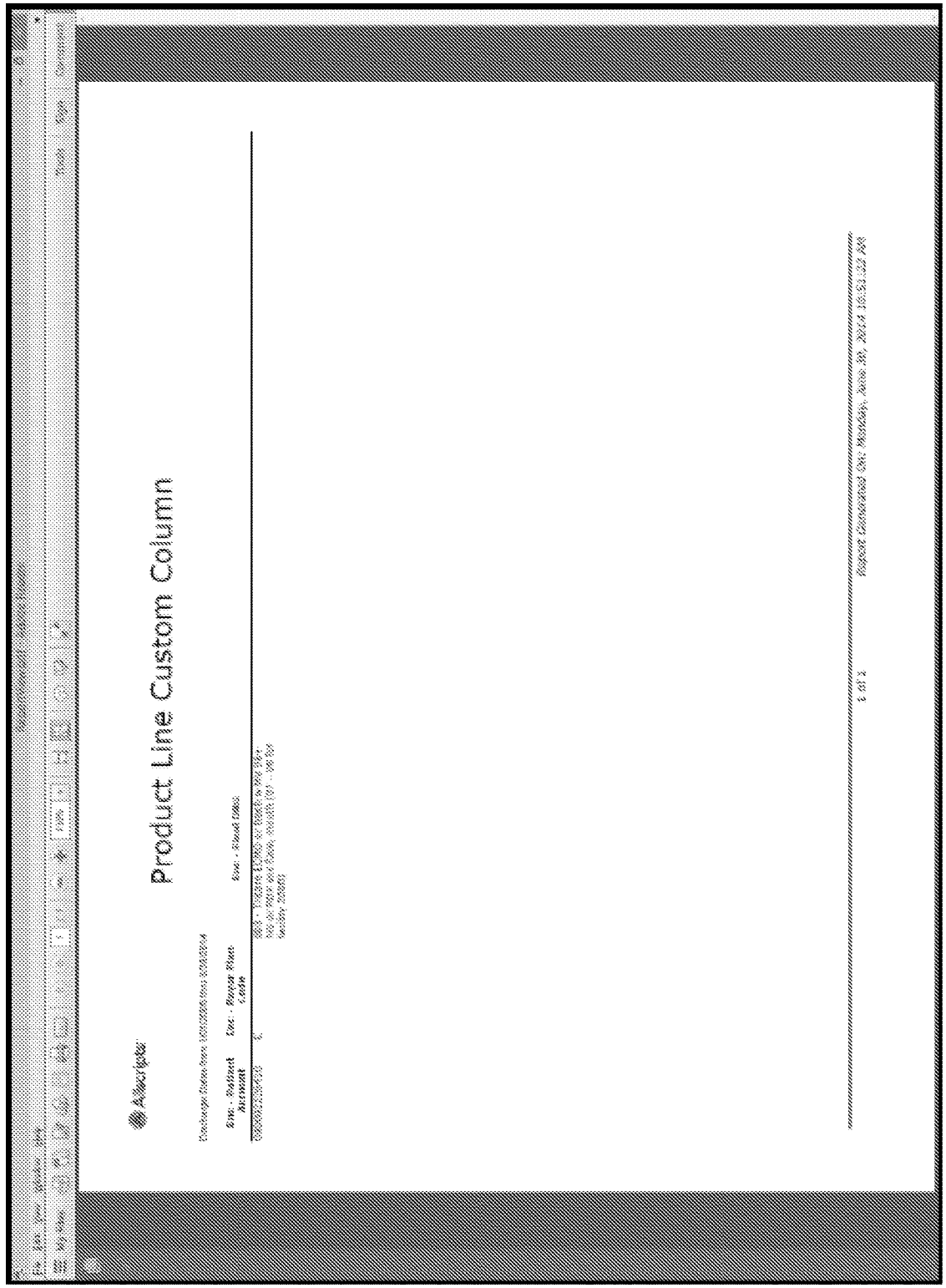
FIG. 18 is an illustration of an example report printed from the Big Data Selector illustrated in FIG. 17.

FIG. 18 is an example screen shot of the same report shown in FIG. 12 after the Payor Plan Assignment was changed.

The disclosed Big Data Selector expands existing selection controls in the ability to handle large data items without exceeding the ability of the current technology to transport the data from the cloud to a client computer. The Selector is able to implement server side paging/filter/sorting and also display items that are pending for status change.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method operable at a client computing device, the method comprising:
    generating a graphical user interface (GUI) configured to retrieve items from a server, the GUI including a first grid configured to include items unassigned for pending data extraction and a second grid configured to include items assigned for pending data extraction;
    receiving items from the server according to a first data extraction, the received items being assigned to the first data extraction;
    displaying a first subset of the received items in a first page of the second grid including items assigned for pending data extraction;
    moving one or more selected items from the first page of the second grid to the first grid, wherein the moving transitions the one or more selected items from an assigned state corresponding to the first data extraction to a pending unassigned state;
    navigating to a second page of the second grid including items assigned for pending data extraction, wherein the second page of the second grid includes a second subset of the received items; and
    displaying the second subset of the received items in the second page of the second grid while the one or more selected items are displayed in the first grid.

2. The method of claim 1, further comprising:
    separating existing items in the first grid from the one or more selected items;
    detecting an indication by a user to save the one or more selected items in the first grid; and
    eliminating a separation indicator between the existing items and the one or more selected items;
    wherein each of the existing items and the one or more selected items in the first grid are given an unassigned state.

3. The method of claim 1, further comprising;
    receiving subsequent items from the server according to a second data extraction;
    replacing previously existing items in the second grid with the subsequent items, wherein the subsequent items are assigned to the second data extraction;
    displaying a subset of the subsequent items in a subsequent first page of the second grid; and
    moving one or more subsequently selected items from the subsequent first page of the second grid to the first grid, wherein the one or more subsequently selected items transition from an assigned state corresponding to the second data extraction to a subsequently pending unassigned state.

4. The method of claim 3, further comprising:
    separating the one or more subsequently selected items from previously existing items in the first grid;
    detecting an indication by a user to save the one or more subsequently selected items in the first grid;
    eliminating a separation indicator between the previously existing items and the one or more subsequently selected items; and
    changing the subsequently pending unassigned state of the one or more subsequently selected items to a subsequent unassigned state.

5. The method of claim 1, wherein the generating further includes generating the GUI to include:
    one or more paging controls comprising:
        an item display count for defining a number of items to be displayed per page in at least one of the first grid or the second grid; and a page indicator for navigating between multiple pages in at least one of the first grid or the second grid.

6. The method of claim 1, further comprising:
    detecting an input by a user of a column filter criteria;
    initiating a column filter in the second grid to identify to the user one or more items in accordance with the column filter criteria; and
    displaying at least one of the one or more items that are in accordance with the column filter criteria in the second grid.

7. A client computing device comprising:
    one or more client processors configured to perform operations comprising:
        generating a graphical user interface (GUI) configured to retrieve items from a server, the GUI including a first grid configured to include items unassigned for pending data extraction and a second grid configured to include items assigned for pending data extraction;
        receiving items from the server according to a first data extraction, the received items being assigned to the first data extraction;
        displaying a first subset of the received items in a first page of the second grid including items assigned for pending data extraction;
        moving one or more selected items from the first page of the second grid to the first grid, wherein the moving transitions the one or more selected items from an assigned state corresponding to the first data extraction to a pending unassigned state;
        navigating to a second page of the second grid, wherein the second page of the second grid including items assigned for pending data extraction includes a second subset of the received items; and
        displaying the second subset of the received items in the second page of the second grid while the one or more selected items are displayed in the first grid.

8. The client computing device of claim 7, wherein the one or more client processors perform operations further comprising:
    separating existing items in the first grid from the one or more selected items;
    detecting an indication by a user to save the one or more selected items in the first grid; and
    eliminating a separation indicator between the existing items and the one or more selected items;
    wherein each of the existing items and the one or more selected items in the first grid are given an unassigned state.

9. The client computing device of claim 7, wherein the one or more client processors perform operations further comprising:
    receiving subsequent items from the server according to a second data extraction;
    replacing previously existing items in the second grid with the subsequent items, wherein the subsequent items are assigned to the second data extraction;
    displaying a subset of the subsequent items in a subsequent first page of the second grid; and
    moving one or more subsequently selected items from the subsequent first page of the second grid to the first grid, wherein the one or more subsequently selected items transition from an assigned state corresponding to the second data extraction to a subsequently pending unassigned state.

10. The client computing device of claim 9, wherein the one or more client processors perform operations further comprising:
    separating the one or more subsequently selected items from previously existing items in the first grid;
    detecting an indication by a user to save the one or more subsequently selected items in the first grid;
    eliminating a separation indicator between the previously existing items and the one or more subsequently selected items; and
    changing the subsequently pending unassigned state of the one or more subsequently selected items to a subsequent unassigned state.

11. The client computing device of claim 7, further including:
    one or more paging controls comprising:
    an item display count for defining a number of items to be displayed per page in at least one of the first grid or the second grid ; and
    a page indicator for navigating between multiple pages in at least one of the first grid or the second grid.

12. The client computing device of claim 7, wherein the one or more client processors perform operations further comprising:
    detecting an input by a user of a column filter criteria;
    initiating a column filter in the second grid to identify to the user one or more items in accordance with the column filter criteria; and
    displaying at least one of the one or more items that are in accordance with the column filter criteria in the second grid.

13. A non-transitory computer readable medium storing a program, the program for execution by one or more processors to perform operations comprising:
    generating a graphical user interface (GUI) configured to retrieve items from a server, the GUI comprising a first grid configured to include items unassigned for pending data extraction and a second grid configured to include items assigned for pending data extraction;
    receiving items from the server according to a first data extraction, the received items being assigned to the first data extraction;
    displaying a first subset of the received items in in a first page of the second grid including items assigned for pending data extraction;
    moving one or more selected items from the first page of the second grid to the first grid, wherein the moving transitions the one or more selected items from an assigned state corresponding to the first data extraction to a pending unassigned state;
    navigating to a second page of the second grid, wherein the second page of the second grid including items assigned for pending data extraction includes a second subset of the received items; and
    displaying the second subset of the received items in the second page of the second grid while the one or more selected items are displayed in the first grid.

14. The method of claim 1, further comprising:
    receiving subsequent items from the server according to a second data extraction;
    replacing previously existing items in the second grid with the subsequent items, wherein the subsequent items are assigned to the second data extraction; and
    moving at least one item in the first grid to the second grid, wherein the at least one item transitions to a pending assigned state corresponding to the second data extraction.

15. The method of claim 14, further comprising:
    separating the at least one item from the subsequent items in the second grid;
    detecting an indication by a user to save the at least one item in the second grid;
    eliminating a separation indicator between the at least one item and the subsequent items; and
    changing the pending assigned state of the at least one item so that each of the at least one item and the subsequent items are assigned to the second data extraction.

16. The client computing device of claim 7, wherein the one or more client processors perform operations further comprising:
    receiving subsequent items from the server according to a second data extraction;
    replacing previously existing items in the second grid with the subsequent items, wherein the subsequent items are assigned to the second data extraction; and
    moving at least one item in the first grid to the second grid, wherein the at least one item transitions to a pending assigned state corresponding to the second data extraction.

17. The client computing device of claim 16, wherein the one or more client processors perform operations further comprising:
    separating the at least one item from the subsequent items in the second grid;
    detecting an indication by a user to save the at least one item in the second grid;
    eliminating a separation indicator between the at least one item and the subsequent items; and
    changing the pending assigned state of the at least one item so that each of the at least one item and the subsequent items are assigned to the second data extraction.

* * * * *